Patented Nov. 26, 1929

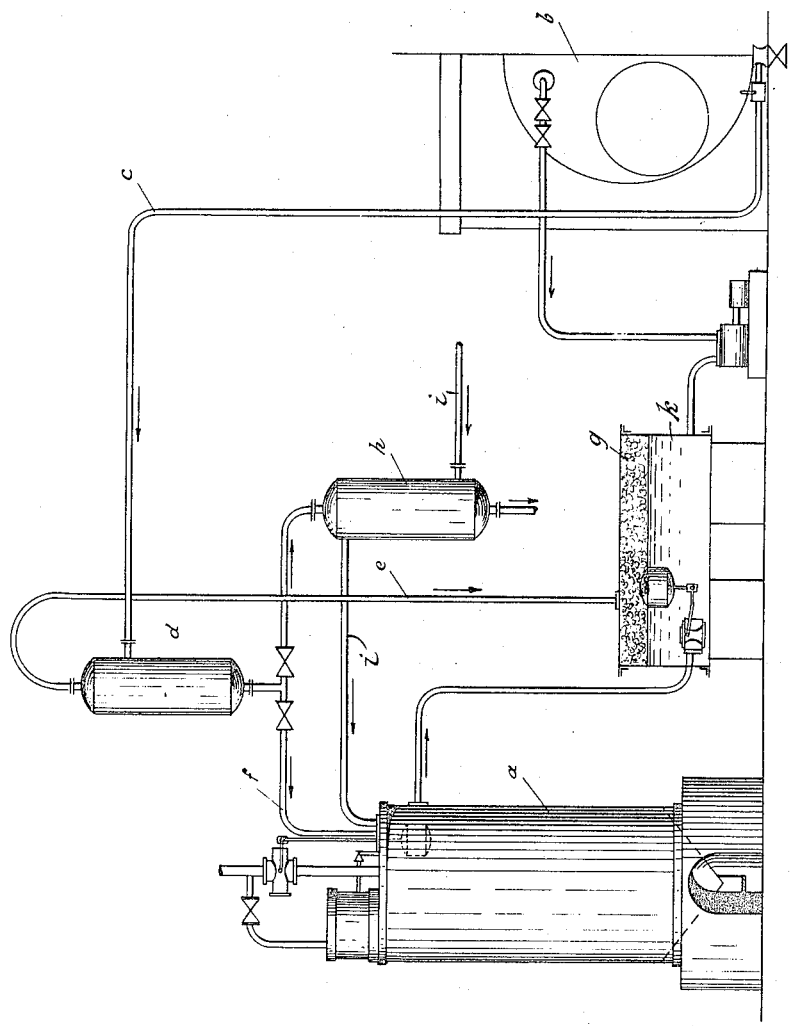

1,737,448

UNITED STATES PATENT OFFICE

MORITZ BAUER, OF STUTTGART, GERMANY

METHOD OF WORKING FOR THE CLEANING OF BOILER-FEEDING WATER

Application filed July 22, 1925. Serial No. 45,358.

The purification of boiler feed water which involves conducting the sludge water from the boiler to the purifying apparatus and supplying the water thus purified from sludge back to the boiler, has heretofore been beset with many drawbacks, one being that the steam carried over with the sludge into the purifying apparatus has caused boiling over of some of the sludge into the body of feed water already purified and held in reserve for supplying to the boiler, the other defect being that certain salts in the reserve supply of purified feed water became oxidized by contact with the atmosphere so as to form scale or deposits upon the subsequent boiling of this water in the boiler.

The invention hereinafter described overcomes these disadvantages in a very simple way and also affords the possibility in works where a large amount of purified water is produced of protecting it from absorption of oxygen from the air and of removing easily soluble salts which accumulate in the water in the boiler without any appreciable loss of heat.

The process is shown in a diagrammatic form by way of example.

The method of carrying it out is as follows:

To the purifying apparatus $a$ crude water is supplied in the usual way at any desired temperature together with the necessary chemicals. From the the boiler $b$ more or less boiler sludge water is carried off through the pipe $c$ according to the excess of pressure in the boiler and is taken first to an expansion chamber $d$. The boiler sludge water which enters the chamber $d$ is deprived of its pressure therein and gives up a corresponding amount of fluid heat in the form of steam, which is carried off separately through the pipe $e$, while the sludgy boiler water cooled down to 100 degrees C. is carried off through the pipe $f$ to the water purifier in which it deposits the sludge which it has carried with it from the boiler and at the same time gives up any excess of chemicals carried off from the boiler to the crude water, to permit use of such excess of chemicals in connection with the crude water to be treated.

Should there be an accumulation of easily soluble salts such as common salt, Glauber's salt, etc., in the water in the boiler their concentration can be kept within definite and innocuous limits by not passing the sludgy water which runs off from the pipe $f$ into the purifying apparatus but to a pre-heater $h$ through which crude water flows by pipe $i$, and then into the open air.

Boiling over of the purifying apparatus in this process can no longer take place, as the boiler sludge water enters the purifying apparatus at a temperature not above 100 degrees C. and therefore makes any generation of steam impossible. The steam carried off through the pipe $e$ may be conveniently used for heating up the feed water in the pure water reservoir $k$ or also according to this invention for forming a cushion of steam $g$ above the surface of the water in the tank $k$ which, by filling the space above the water with steam, renders the access of air to the feed water impossible. The latter arrangement is particularly convenient when the feed water consists of a mixture of condensed water and purified water.

I claim:

The process for purifying boiler feed water which comprises conducting the boiler sludge to purifying apparatus through an interposed expansion chamber in which the sludge is freed from steam, thereby preventing boiling over of the sludge in the purifying apparatus, and causing the steam thus liberated from the sludge to fill the space above the liquid level in a closed reservoir in which purified feed water is received from the purifying apparatus and from which it is supplied to the boiler, the presence of said steam thus excluding atmospheric oxygen from contact with the feed water in said reservoir.

In testimony whereof I affix my signature.

MORITZ BAUER.